United States Patent
Park et al.

(10) Patent No.: US 7,427,977 B2
(45) Date of Patent: Sep. 23, 2008

(54) LAMP DRIVING DEVICE FOR LIQUID CRYSTAL DISPLAY DEVICE

(75) Inventors: Sin Kyun Park, Gumi-si (KR); Kang Ju Lee, Gyeongsan-si (KR)

(73) Assignee: LG Display Co., Ltd., Seoul (KR)

( * ) Notice: Subject to any disclaimer, the term of this patent is extended or adjusted under 35 U.S.C. 154(b) by 554 days.

(21) Appl. No.: 11/010,450

(22) Filed: Dec. 14, 2004

(65) Prior Publication Data

US 2005/0128377 A1  Jun. 16, 2005

(30) Foreign Application Priority Data

Dec. 16, 2003  (KR) .................. 10-2003-0091799

(51) Int. Cl.
  *G09G 3/36* (2006.01)
(52) U.S. Cl. ........................ 345/102; 345/87
(58) Field of Classification Search .............. 345/74.1, 345/211, 87, 52, 32, 102; 315/169.3, 213, 315/227 R, 246, 291; 310/318; 349/59, 349/149, 113, 106, 53; 363/22, 131; 361/303; 362/492, 613, 247; 326/38; 438/166; 257/72
See application file for complete search history.

(56) References Cited

U.S. PATENT DOCUMENTS

| | | | | |
|---|---|---|---|---|
| 6,337,543 B1* | 1/2002 | Ge | .................. | 315/227 R |
| 6,411,353 B1* | 6/2002 | Yarita et al. | .................. | 349/59 |
| 6,411,359 B1* | 6/2002 | Kobayashi et al. | .......... | 349/149 |
| 6,459,601 B1* | 10/2002 | Oba | .................. | 363/131 |
| 6,628,355 B1* | 9/2003 | Takahara | .................. | 349/106 |
| 6,636,190 B2* | 10/2003 | Hirakata et al. | .......... | 345/74.1 |
| 6,798,640 B1* | 9/2004 | Novak | .................. | 361/303 |
| 7,084,666 B2* | 8/2006 | Madurawe | .................. | 326/38 |
| 7,095,180 B2* | 8/2006 | Emslie et al. | .................. | 315/161 |
| 7,173,379 B2* | 2/2007 | Ball | .................. | 315/213 |
| 7,265,500 B2* | 9/2007 | Ono et al. | .................. | 315/291 |
| 7,354,173 B2* | 4/2008 | Ono | .................. | 362/247 |
| 2002/0159270 A1* | 10/2002 | Lynam et al. | .......... | 362/492 |
| 2003/0053016 A1* | 3/2003 | Kubota et al. | .......... | 349/113 |
| 2003/0102478 A1* | 6/2003 | Joo et al. | .................. | 257/72 |
| 2003/0151931 A1* | 8/2003 | Kohno | .................. | 363/22 |
| 2003/0234620 A1* | 12/2003 | Pennaz et al. | .......... | 315/169.3 |
| 2004/0245939 A1* | 12/2004 | Kitagawa et al. | .......... | 315/246 |
| 2004/0246394 A1* | 12/2004 | Ono et al. | .................. | 349/53 |
| 2005/0285478 A1* | 12/2005 | Takeda et al. | .......... | 310/318 |
| 2006/0083025 A1* | 4/2006 | Ono | .................. | 362/613 |
| 2007/0087492 A1* | 4/2007 | Yamanaka | .................. | 438/166 |

* cited by examiner

*Primary Examiner*—Prabodh Dharia
(74) *Attorney, Agent, or Firm*—Morgan, Lewis & Bockius LLP

(57) ABSTRACT

A lamp driving device for driving a plurality of lamps in a liquid crystal display device and a liquid crystal display device using a lamp driving device are provided. The lamp driving device includes an inverter substrate, a plurality of transformers on the inverter substrate to supply a high voltage AC waveform to each of the lamps; and a plurality of pattern capacitors on the inverter substrate to limit the electric current supplied to each of the lamps. The patterns capacitors have a plurality of capacitor patterns on a front surface of the inverter substrate with a designated distance therebetween and a first ground line on a rear surface of the inverter substrate overlapping the capacitor patterns.

12 Claims, 8 Drawing Sheets

LAMP DRIVING DEVICE FOR LIQUID CRYSTAL DISPLAY DEVICE

This application claims the benefit of Korean Patent Application No. P2003-91799 filed in Korea on Dec. 16, 2003, which is hereby incorporated by reference.

BACKGROUND OF THE INVENTION

1. Field of the Invention

The present invention relates to a liquid crystal display device, and more particularly, to a lamp driving device of a liquid crystal display device.

2. Description of the Related Art

Generally, liquid crystal display (LCD) devices are gradually increasing with respect to application scope due to characteristics such as low weight, thinness, and low power consumption. According to such trends, LCD devices are used in office automation equipment, audio/video devices, and other applications. On the other hand, LCD devices display a desired picture on a screen by controlling light transmittance in accordance with a video signal applied to a plurality of control switches arranged in a matrix.

An LCD needs a light source, such as a backlight unit, because it is not a self-luminous display device. A cold cathode fluorescent lamp (hereinafter, referred to as a "lamp") is most commonly used as the light source in the backlight unit but other lamp types may be used. The lamp is a light source tube using a cold emission phenomenon in which electrons are emitted due to a strong electric field is applied to the surface of a cathode, thereby realizing low heat generation, high brightness, long life span and full colorization. A liquid crystal display device using a direct illumination type backlight unit having a plurality of lamps tends to be used for units of large size.

Figure 1:
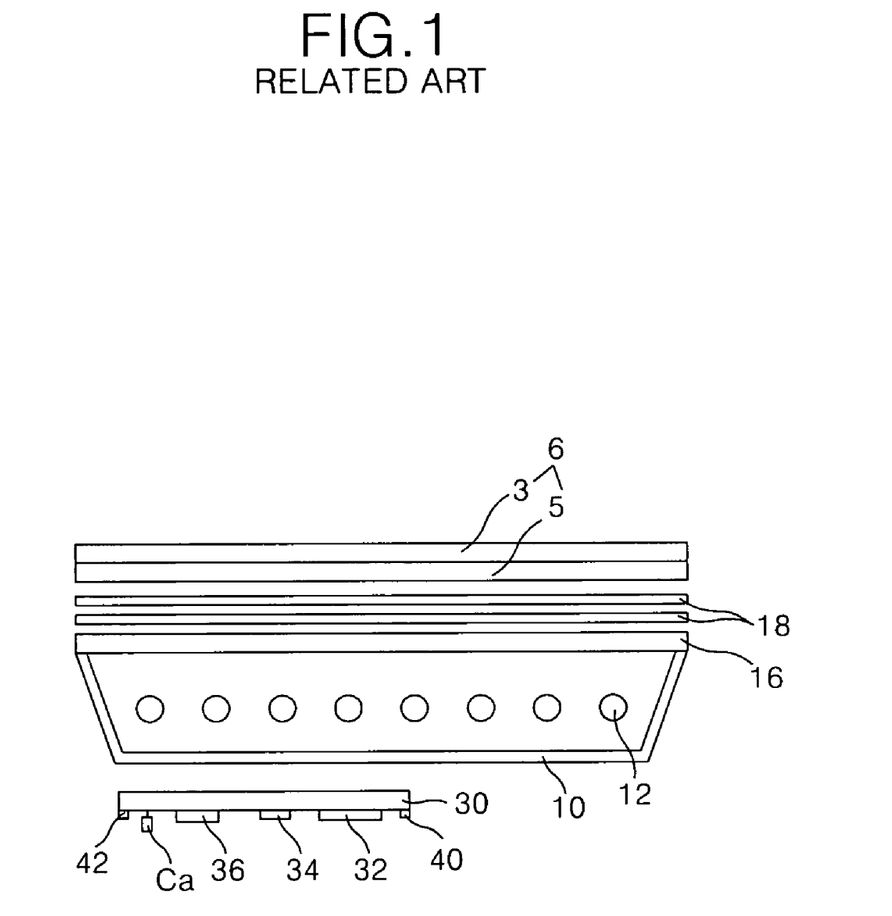
FIG. 1 is a cross-sectional diagram representing a lamp driving device of a general liquid crystal display device.
Figure 2:
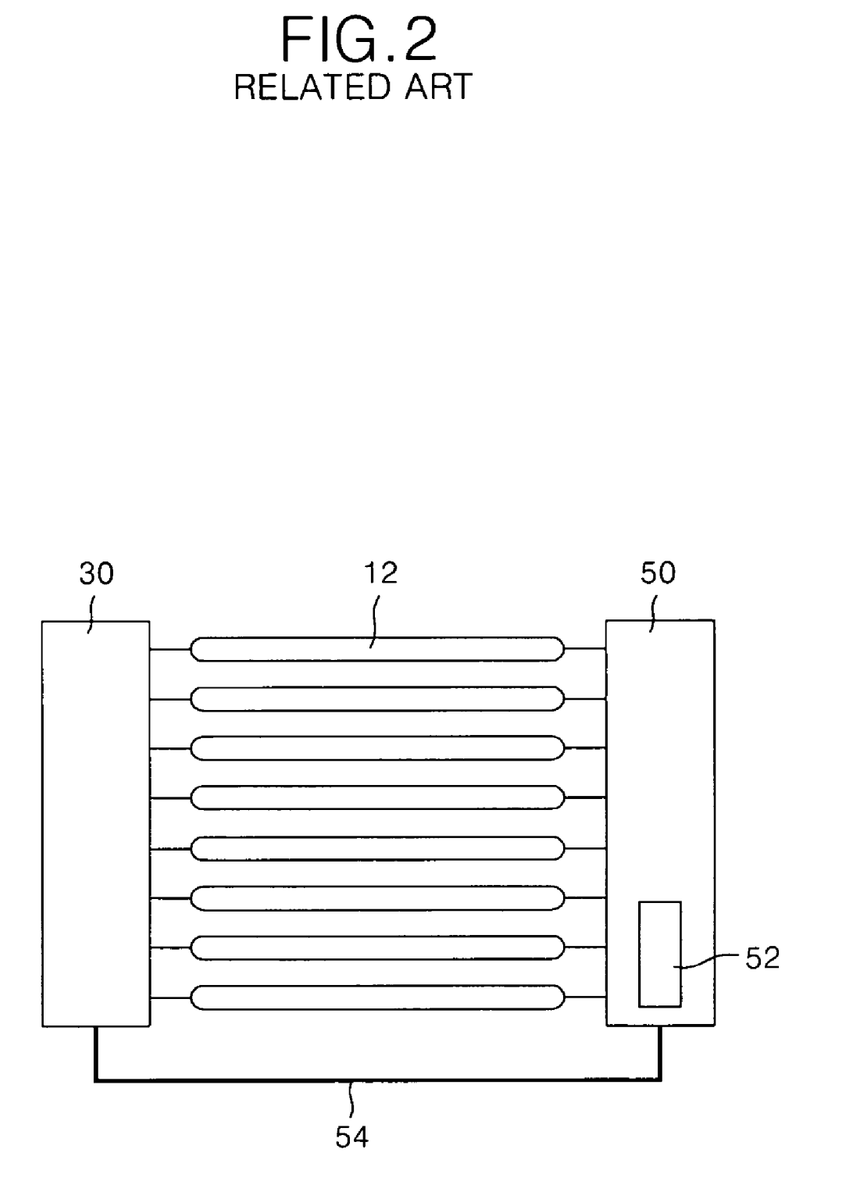
FIG. 2 is a plan view representing an inverter substrate and a feedback substrate to drive a plurality of lamps as shown in FIG. 1.

Referring to FIGS. 1 and 2, a lamp driving device of a general liquid crystal display device includes a liquid crystal display panel 6, a direct illumination type backlight unit having a plurality of lamps 12 to illuminate light to the liquid crystal display panel 6, an inverter substrate 30 to supply a high voltage AC waveform to the lamps 12, and a feedback substrate 50 to detect a tube current that flows in the lamps 12 to feed the detected tube current back to the inverter substrate 30.

The liquid crystal display panel 6 has a liquid crystal injected between an upper substrate 3 and a lower substrate 5; and a spacer (not shown) for sustaining a uniform distance between the upper substrate 3 and the lower substrate 5. In the upper substrate 3 of the liquid crystal display panel 6, a color filter, a common electrode, a black matrix and so on (not shown) are formed. Further, in the lower substrate 5 of the liquid crystal display panel 6, signal lines such as a data line and a gate line (not shown) are formed, and a thin film transistor is formed at an intersection of the data line and the gate line. The thin film transistor responds to a scan signal—gate pulse—from the gate line to switch the data signal that is to be transmitted from the data line to the liquid crystal cell. A pixel electrode is formed at a pixel area between the data line and the gate line. Further, a pad area, which is connected to each of the data line and the gate line, is formed at one side of the lower substrate 5, and a tape carrier package (not shown), on which a driver integrated circuit for applying a driving signal to the thin film transistor is mounted, is stuck to the pad area. The tape carrier package supplies the data signal and the scan signal from the driver integrated circuit to the data lines and the gate lines.

An upper polarizing sheet (not shown) is disposed the upper substrate 3 of the liquid crystal display panel 6, and a lower polarizing sheet (not shown) is disposed on the rear surface of the lower substrate 5. At this moment, the upper and lower polarizing sheets plays the role of extending the viewing angle of a picture that is displayed by a liquid crystal cell matrix.

The direct illumination type backlight unit is arranged in parallel and includes a plurality of lamps 12 that illuminates light to the liquid crystal display panel 6, a bottom cover 10 holding the lamps 12, a diffusion plate 16 to cover the front surface of the bottom cover 10, and optical sheets sequentially deposited on the diffusion plate 16. Each of the lamps 12 is composed of a glass tube, an inert gas inside the glass tube, and high voltage and low voltage electrodes installed at both ends of the glass tube. The inert gas is filled inside the glass tube, and a fluorescent substance is spread in the inner wall of the glass tube. In each of the lamps 12, if the AC voltage of high voltage supplied from the inverter substrate 30 applied to a high voltage electrode, an electron is emitted to collide with the inert gas inside the glass tube, thereby increasing the amount of electrons by geometric progression. The increased electrons cause electric current to flow in the inside of the glass tube, thereby exciting the inert gas Ar, Ne by the electron to generate energy, and the energy excites mercury to emit ultraviolet light. The ultraviolet light collides with the luminous fluorescent substance, which is spread over the inner wall of the glass tube, to emit visible light.

The bottom cover 10 of aluminum prevents the light leakage of the visible light emitted from each of the lamps 12 and reflects the visible light progressing to the side surface and rear surface of the lamps 12 toward the front surface, thereby improving the efficiency of the light generated from the lamps 12. For this, a reflecting sheet (not shown) is disposed on the bottom surface of the bottom cover 10 to reflect the light from the lamps 12.

The diffusion plate 16 causes the light emitted from the lamps 12 to progress toward the liquid crystal display panel 6 and to be incident from a wide range of angles. The diffusion plate 16 is a transparent resin film which is coated with a light diffusing member on both sides. The optical sheet 18 improves the efficiency of the light incident from the diffusion plate 16, thereby illuminating light onto the liquid crystal display panel 6.

The feedback substrate 50 includes a feedback circuit 52 that is connected to the low voltage electrode of each lamp 12 to detect the tube current that flows in the lamps 12. The feedback circuit 52 detects a voltage corresponding to the tube current that flows in the lamps 12, and rectifies the detected voltage with a diode, and then distributes the rectified voltage to divided-voltage resistance columns to detect the feedback signal. The feedback circuit 52 supplies the feedback signal detected through a feedback cable 54 to the inverter substrate 30.

Figure 3:
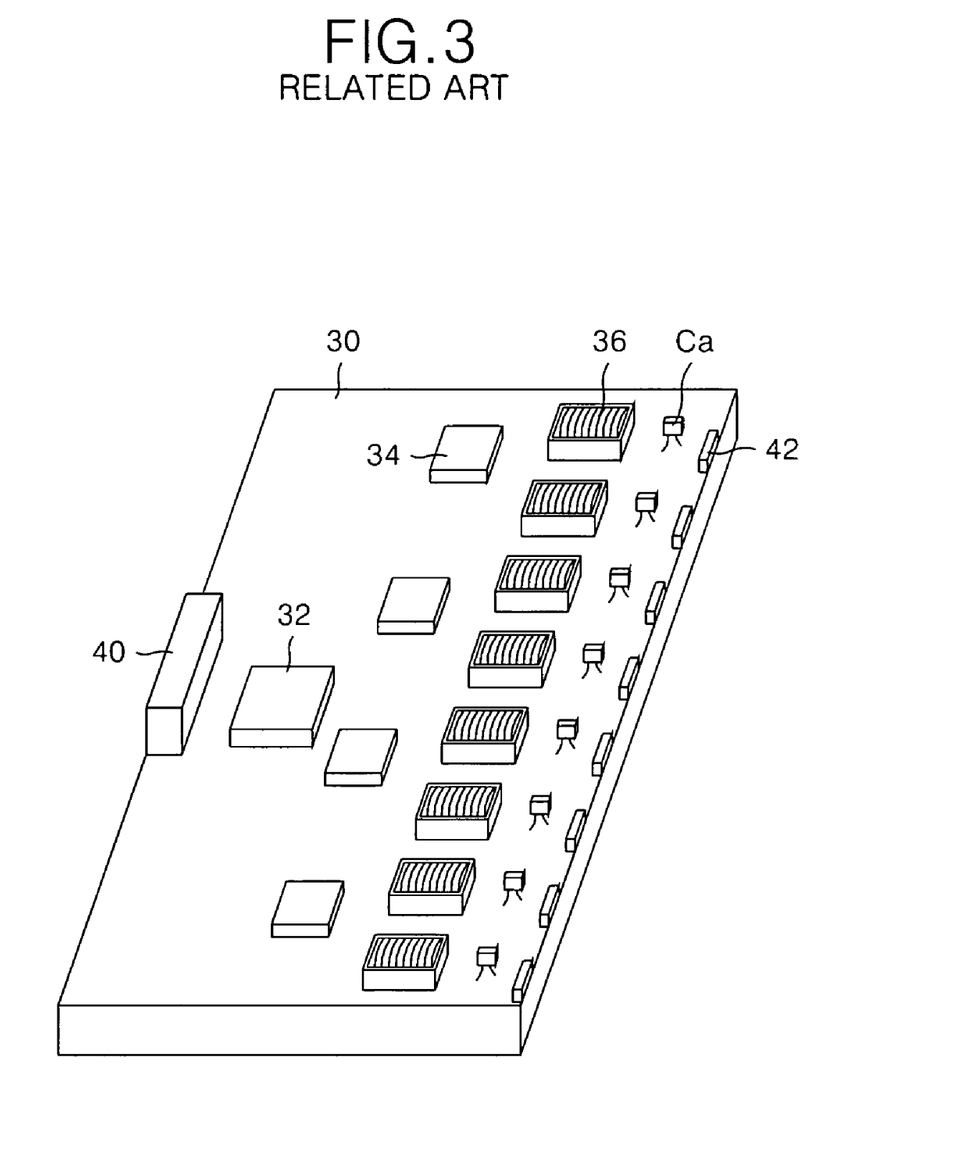
FIG. 3 is a perspective view representing the inverter substrate shown in FIG. 2.

As shown in FIG. 3, the inverter substrate 30 includes an input connector 40 connected to an external system; a plurality of inverter integrated circuit 34 to convert the lamp drive voltage supplied through the input connector 40 into an AC waveform; a main integrated. circuit 32 to switch the lamp drive voltage supplied through the input connector 40 to the inverter integrated circuits 34; a plurality of transformers 36 to convert the AC waveform from each of the inverter integrated circuits 34 into the AC waveform of high voltage; a plurality of output connectors 42 to output the AC waveform of high voltage supplied from the output terminal of a high voltage side of each transformer 36; and a plurality of ballast capacitors Ca connected between the output connectors 42 and the output terminals of the high voltage side of the transformers 36.

Each of the inverter integrated circuit 34 includes first and second switching devices (not shown) that convert the lamp drive voltage supplied from the main integrated circuit 32 into the AC waveform. In this way, each of the inverter integrated circuits 34 converts the lamp drive voltage into the AC waveform using the first and second switching devices to be supplied to each of two transformers 36 among the transformers 36. In other words, one inverter integrated circuit 34 drives two transformers 36. Further, each of the inverter integrated circuit 34 responds to the feedback signal supplied from the feedback substrate 50 through the feedback cable 54 to control the switching timing of first and second switching devices, thereby controlling the size of the AC waveform.

Each of the transformers 36 is arranged in parallel on the inverter substrate 30 and is composed of a primary winding and a secondary winding wound inside a body. Each transformer 36 induces the AC waveform supplied from each of the inverter integrated circuits 34 to the primary winding, to the secondary winding. The high voltage AC waveform induced to the secondary winding by the winding ratio between the primary winding and the secondary winding is supplied to each output terminal 42. The output connector 42 supplies the high voltage AC waveform to each high voltage electrode of the lamps 12 through wires (not shown).

Each ballast capacitor Ca limits the current of the high voltage AC waveform supplied from the transformer 36 to play the role of making the current balance of the inside of the lamp 12 uniform. The ballast capacitor Ca is mounted on the inverter substrate 30 by soldering a generally-used high voltage capacitor on the output terminals of the high voltage side of the transformers 36 and the output connectors 42. In this way, the lamp driving device of the general liquid crystal display device provides light—generated by the high voltage AC waveform supplied from the inverter substrate 30 to the lamps 12—onto the liquid crystal display panel 6 to control the amount of transmitted light, thereby displaying a desired picture on the liquid crystal display panel.

However, the lamp driving device of the general liquid crystal display device has the inverter substrate 30 with a large structure because of the ballast capacitors Ca mounted on the inverter substrate 30 to control the current balance of the inside of the lamps 12 as well as to limit the tube current of the lamps 12. Further, the lamp driving device of the general liquid crystal display device has a noise generated by a spark generated when making a measuring probe terminal in contact with or separated from the ballast capacitor Ca of high voltage to evaluate the characteristics of the inverter. The noise causes the feedback signal line of the inverter substrate 30 connected to the feedback cable 54 to make the inverter integrated circuit 34 mis-operate, thereby generating a shutdown phenomenon of the main integrated circuit 32.

SUMMARY OF THE INVENTION

Accordingly, the present invention is directed to a lamp driving device for a liquid crystal display device that substantially obviates one or more of the problems due to limitations and disadvantages of the related art.

An object of the present invention to provide a lamp driving device of a liquid crystal display device that is adaptive for preventing the mis-operation of an inverter as well as simplifying the structure of an inverter to drive a plurality of lamps.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a lamp driving device for driving a plurality of lamps in a liquid crystal display device, comprises an inverter substrate; a plurality of transformers disposed on the inverter substrate to supply a high voltage AC waveform to each of the lamps; and a plurality of pattern capacitors on the inverter substrate to limit the electric current supplied to each of the lamps, the pattern capacitors including a plurality of capacitor patterns on a front surface of the inverter substrate with a designated distance therebetween and a first ground line on a rear surface of the inverter substrate overlapping the capacitor patterns.

In another aspect, liquid crystal display device comprises a liquid crystal display panel; a direct illumination type backlight unit having a plurality of lamps to provide light to the liquid crystal display panel; an inverter substrate having a plurality of transformers to supply a high voltage AC waveform to each of the lamps; and a plurality of pattern capacitors on the inverter substrate to limit the electric current supplied to each of the lamps, the pattern capacitors including a plurality of capacitor patterns on a front surface of the inverter substrate with a designated distance therebetween and a first ground line on a rear surface of the inverter substrate overlapping the capacitor patterns.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the preferred embodiments of the present invention will be described in detail with reference to FIGS. 4 to 8.

Figure 4:
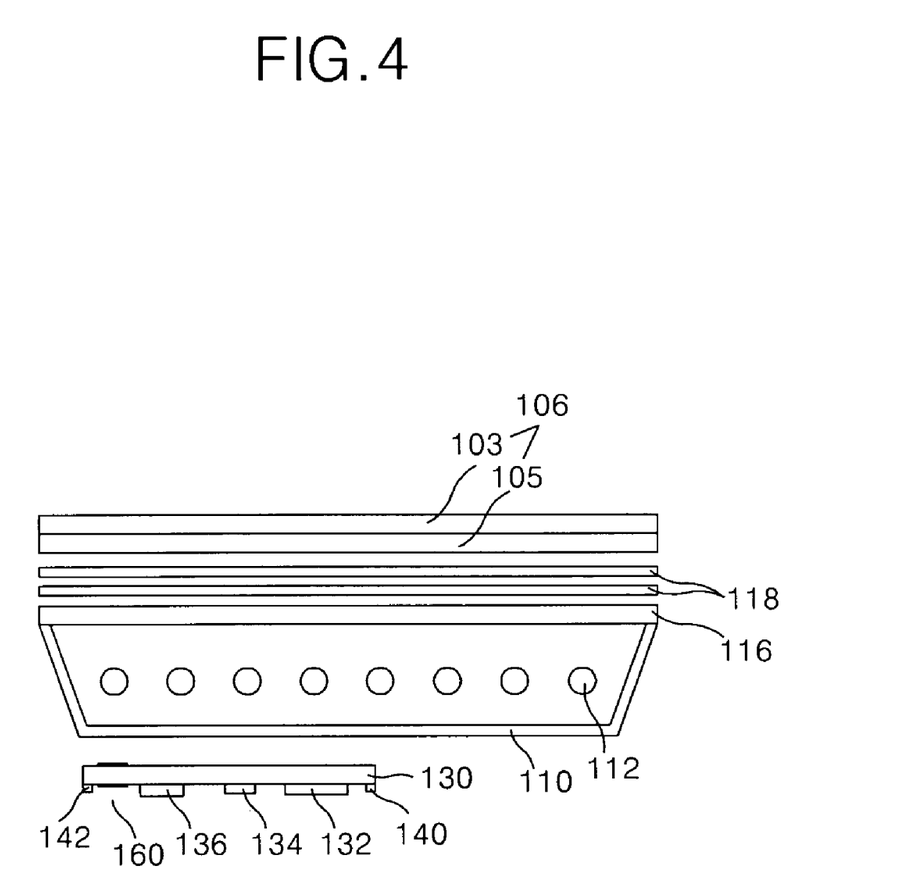
FIG. 4 is a cross-sectional view representing a lamp driving device of a liquid crystal display device according to an exemplary embodiment of the present invention.
Figure 5:
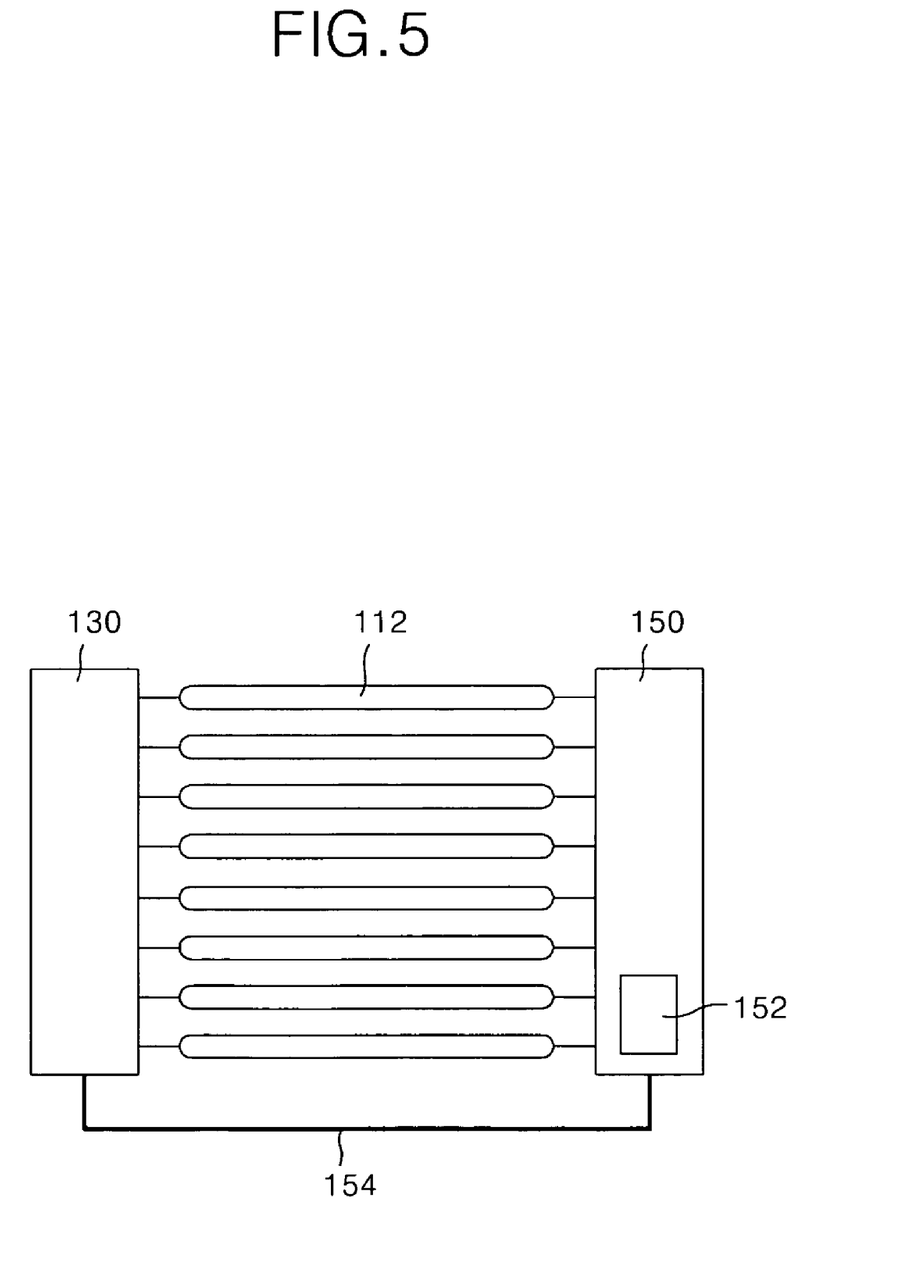
FIG. 5 is a plan view representing an inverter substrate and a feedback substrate to drive a plurality of lamps as shown in FIG. 4.

Referring to FIGS. 4 and 5, a lamp driving device of a liquid crystal display device according to an embodiment of the present invention includes a liquid crystal display panel 106, a direct illumination type backlight unit having a plurality of lamps 112 to illuminate light to the liquid crystal display panel 106, an inverter substrate 130 to supply an AC waveform of high voltage to the lamps 112, a pattern capacitor 160 formed on the inverter substrate 130 to make the current balance of the inside of the lamps 112 as well as to limit the tube current supplied to the lamps 112, and a feedback substrate 150 to detect a tube current that flows in the lamps 112 to feed the detected tube current back to the inverter substrate 130.

The liquid crystal display panel 106 has a liquid crystal injected between an upper substrate 103 and a lower substrate 105; and a spacer (not shown) for sustaining the distance between the upper substrate 103 and the lower substrate 105 uniformly. In the upper substrate 103 of the liquid crystal display panel 106, a color filter, a common electrode, a black matrix and so on (not shown) are formed. Further, in the lower substrate 105 of the liquid crystal display panel 106, signal lines such as a data line and a gate line (not shown) are formed, and a thin film transistor is formed at an intersection of the data line and the gate line. The thin film transistor responds to a scan signal—gate pulse—from the gate line to switch the data signal that is to be transmitted from the data line to the liquid crystal cell. A pixel electrode is formed at a pixel area between the data line and the gate line. Further, a pad area—which is connected to each of the data line and the gate line—is formed at one side of the lower substrate 105. A tape carrier package (not shown)—on which a driver integrated circuit for applying a driving signal to the thin film transistor is mounted—is provided onto the pad area. The tape carrier package supplies the data signal and the scan signal from the driver integrated circuit to the data lines and the gate lines.

An upper polarizing sheet (not shown) is disposed on the upper substrate 103 of the liquid crystal display panel 106, and a lower polarizing sheet (not shown) is disposed on the rear surface of the lower substrate 105. At this moment, the upper and lower polarizing sheets extends the viewing angle of a picture that is displayed by a liquid crystal cell matrix. The direct illumination type backlight unit is arranged in parallel and includes a plurality of lamps 112 that illuminates light to the liquid crystal display panel 106, a bottom cover 110 holding the lamps 112, a diffusion plate 116 to cover the front surface of the bottom cover 110, and optical sheets sequentially deposited on the diffusion plate 116.

Each of the lamps 112 comprises a glass tube, an inert gas inside the glass tube, and high/low voltage electrodes installed at both ends of the glass tube. The inert gas is filled inside the glass tube, and a fluorescent substance is spread in the inner wall of the glass tube. In each of the lamps 112, if the high voltage AC voltage supplied from the inverter substrate 130 applied to a high voltage electrode, electrons are emitted to collide with the inert gas inside the glass tube, thereby increasing the amount of electrons by geometric progression. The increased electrons cause electric current to flow in the inside of the glass tube, thereby exciting the inert gas Ar, Ne by the electrons to generate energy. Then, the energy excites mercury to emit ultraviolet light. The ultraviolet light is incident on the luminous fluorescent substance disposed over the inner wall of the glass tube to emit visible light.

The bottom cover 110 of aluminum prevents the light leakage of the visible light emitted from each of the lamps 112 and reflects the visible light progressing to the side surface and rear surface of the lamps 112 toward the front surface, thereby improving the efficiency of the light generated from the lamps 112. For this, a reflecting sheet (not shown) is provided on the bottom surface of the bottom cover 110 to reflect the light from the lamps 112.

The diffusion plate 116 causes the light emitted from the lamps 112 to progress toward the liquid crystal display panel 106 and to be incident from a wide range of angles. The diffusion plate 116 transparent resin film coated with a light diffusing member at its both sides. The optical sheet 118 improves the efficiency of the light incident from the diffusion plate 116, thereby illuminating the light onto the liquid crystal display panel 106.

The feedback substrate 150 includes a feedback circuit 152 that is connected to the low voltage electrode of each lamp 112 to detect the tube current that flows in the lamps 112. The feedback circuit 152 detects a voltage corresponding to the tube current that flows in the lamps 112, and rectifies the detected voltage using a diode, and then distributes the rectified voltage to divided voltage resistance columns to detect the feedback signal. The feedback circuit 152 supplies the feedback signal detected through a feedback cable 154 to the inverter substrate 130.

Figure 6:
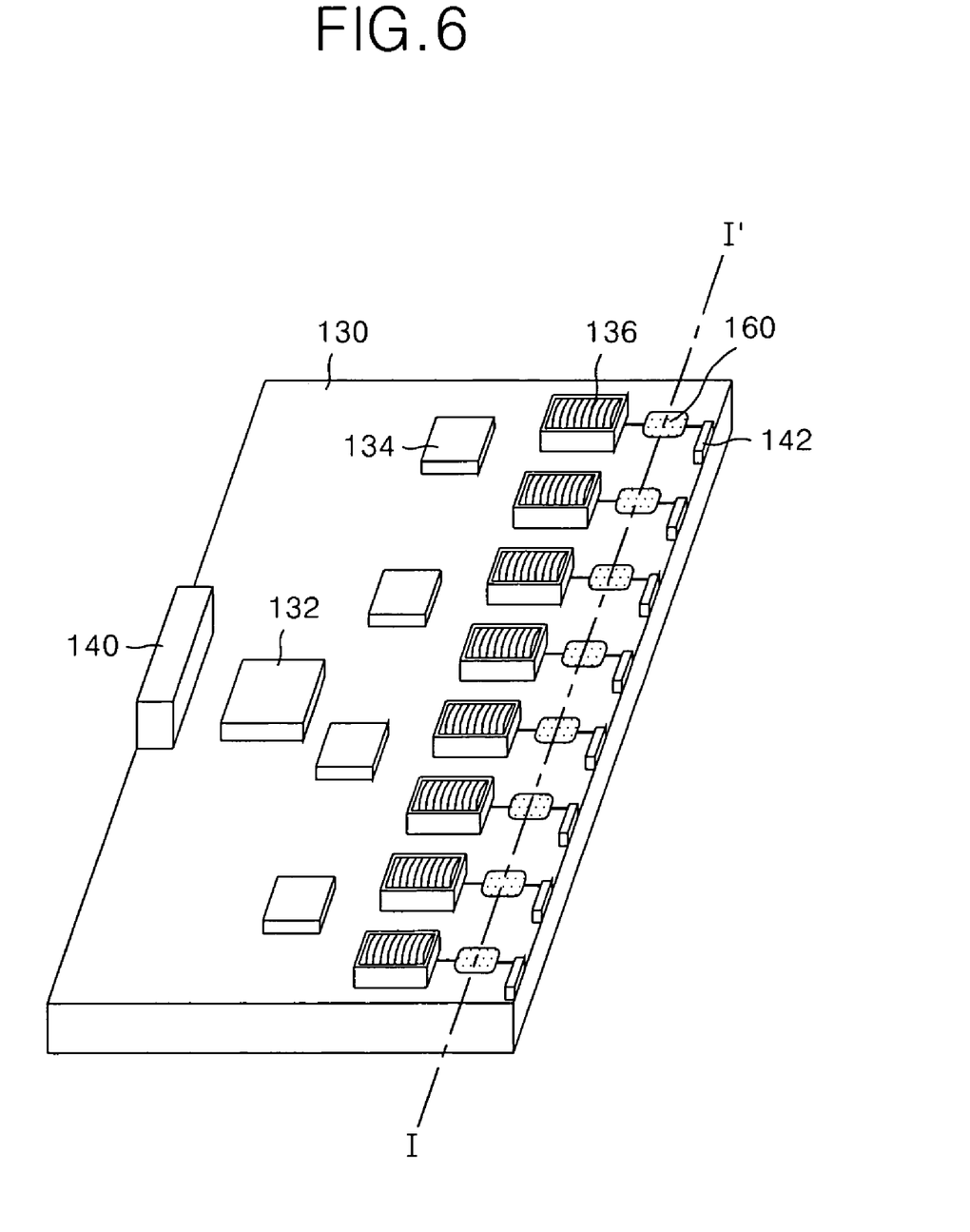
FIG. 6 is a perspective view representing the front surface of the inverter substrate shown in FIG. 5.

As shown in FIG. 6, the inverter substrate 130 includes an input connector 140 connected to an external system; a plurality of inverter integrated circuit 134 to convert the lamp drive voltage supplied through the input connector 140 into an AC waveform; a main integrated circuit 132 to switch the lamp drive voltage supplied through the input connector 140 to the inverter integrated circuits 134; a plurality of transformers 136 to convert the AC waveform from each of the inverter integrated circuits 134 into the high voltage AC waveform; and a plurality of output connectors 142 to output the AC waveform of high voltage supplied from the output terminal of a high voltage side of each transformer 136.

Each inverter integrated circuit 134 includes first and second switching devices (not shown) that convert the lamp drive voltage supplied from the main integrated circuit 132 into the AC waveform. In this way, each of the inverter integrated circuits 134 converts the lamp drive voltage into the AC waveform using the first and second switching devices to supply the AC waveform to each of two transformers 136 among the transformers 136. In other words, one inverter integrated circuit 134 drives two transformers 136. Further, each of the inverter integrated circuit 134 responds to the feedback signal supplied from the feedback substrate 150 through the feedback cable 154 to control the switching timing of first and second switching devices, thereby controlling the size of the AC waveform.

Each of the transformers 136 is arranged in parallel on the inverter substrate 130 and comprises a primary winding and a secondary winding wound inside a body. Each transformer 136 induces the AC waveform supplied from each of the inverter integrated circuits 134 to the primary winding, to the secondary winding. The high voltage AC waveform induced to the secondary winding by the winding ratio between the primary winding and the secondary winding is supplied to each output terminal 142. The output connector 142 supplies the high voltage AC waveform to each high voltage electrode of the lamps 112 through wires (not shown). Each of the pattern capacitors 160 is formed on the inverter substrate 130 between the high voltage side output terminal of each transformer 136 and the output connector 142.

Figure 7:
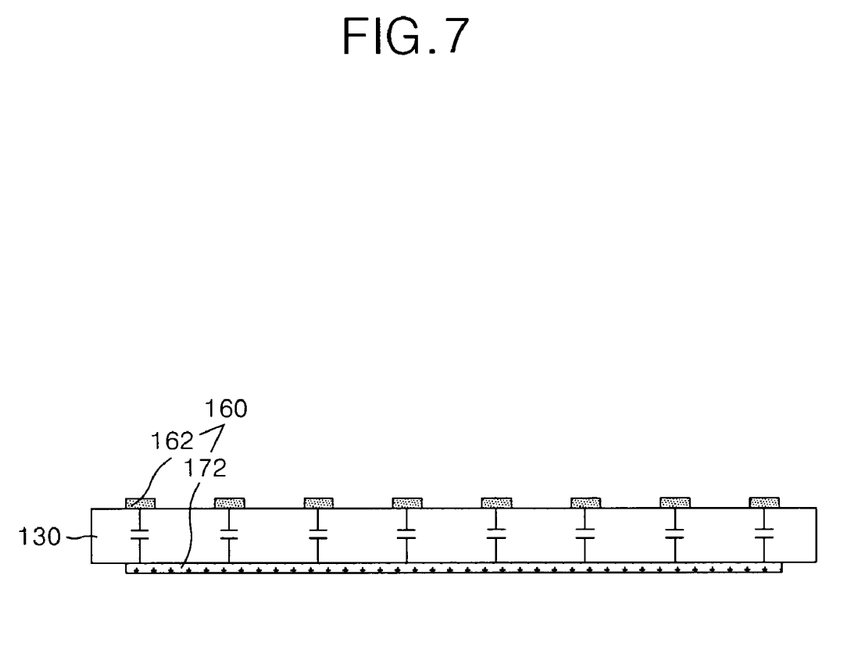
FIG. 7 is a cross-sectional diagram representing the inverter substrate along line I-I' of FIG. 6.

As shown in FIGS. 6 and 7, specifically, the pattern capacitor 160 includes a plurality of capacitor patterns 162 formed on the front surface of the inverter substrate 130 with a designated distance therebetween, and a first ground line 172 formed on the rear surface of the inverter substrate 130 to overlap the capacitor pattern 162. The capacitor patterns 162 are formed to have a designated area on the front surface of the inverter substrate 130 with a designated distance therebetween. One side of each capacitor pattern 162 is connected to the high voltage side output terminal of each transformer 136, and the other side is connected to the output connectors 142.

The first ground line 172 is formed on the rear surface of the inverter substrate 130 in a stripe shape having a designated width. The first ground line 172 overlaps the capacitor pattern 162 with the inverter substrate 130 therebetween. In this way, the pattern capacitor 160 has a dielectric constant of the inverter substrate 130 and a designated capacitance value by the width and the area of the capacitor pattern 162 which overlaps with the first ground line 172. At this moment, the area of the capacitor pattern 162 is set properly to make the capacitance value of the pattern capacitor 160 set as a desired value. Accordingly, the pattern capacitor 160 limits the current of the AC waveform of high voltage supplied from the transformer 136 to the lamp 112 to make the current balance of the inside of the lamp 112 uniform by the capacitance generated between the first ground line 172 and the capacitor pattern 162.

Figure 8:
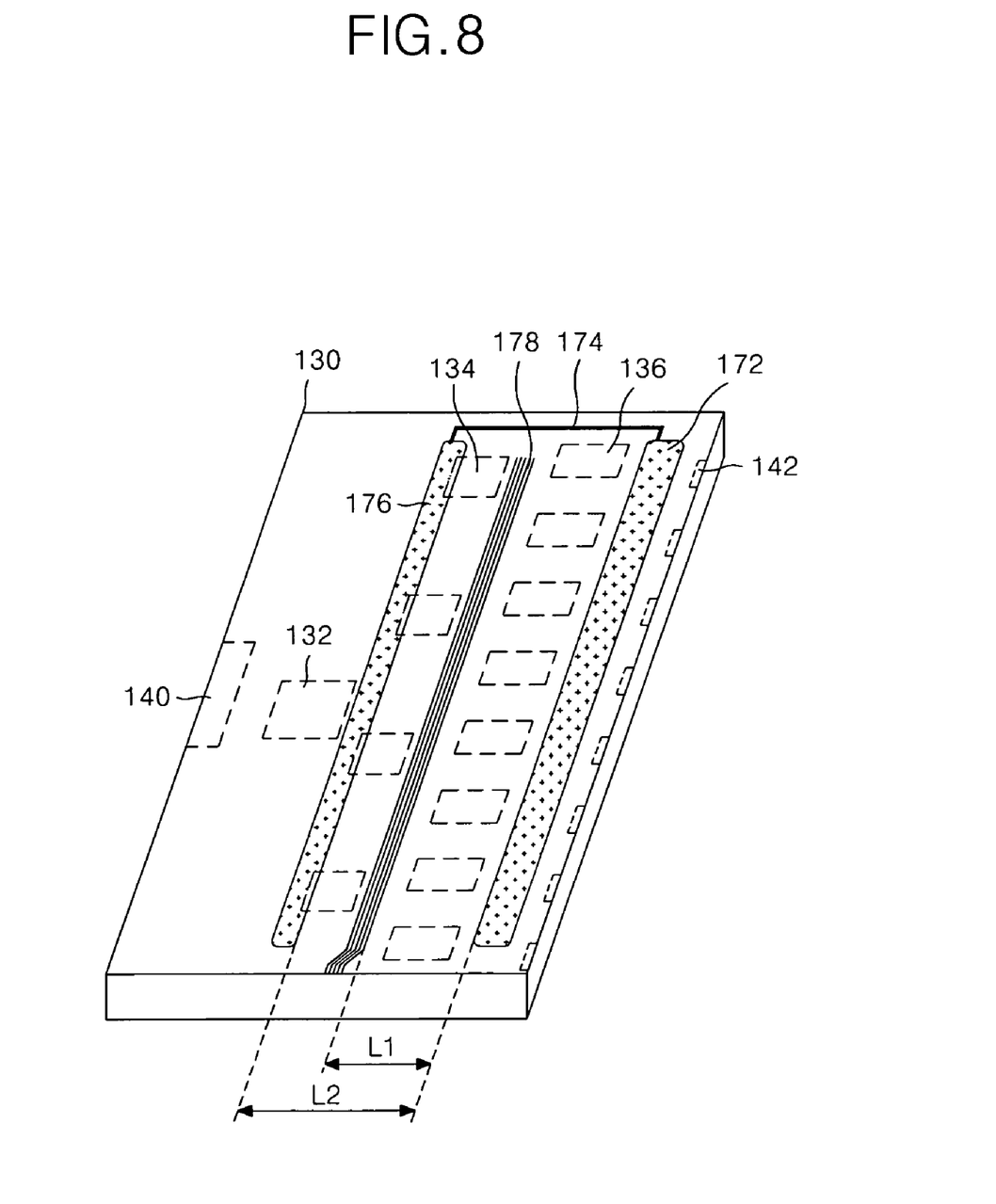
FIG. 8 is a perspective view representing the rear surface of the inverter substrate shown in FIG. 5.

On the other hand, as shown in FIG. 8, on the rear surface of the inverter substrate 130 are formed a second ground line 176 connected to the first ground line 172 to supply ground voltage GND to a plurality of integrated circuits 134; a connecting line 174 formed at the edge of one side of the inverter substrate 130 to connect the first ground line 172 with the second ground line 176; and a feedback signal line 178 formed between the first ground line 172 and the second ground line 176 to be connected to the feedback cable 154. The second ground line 176 is formed on the rear surface of the inverter substrate 130 corresponding between the main integrated circuit 132 and the inverter integrated circuits 134.

When the feedback signal line 178 is adjacent to the first ground line 172, the parasitic capacitor component of the first ground line 172 and the feedback signal line 178 causes the noise generated at the load terminal of the lamp 112 as well as an electro magnetic interference EMI noise to affect the feedback signal line 178. The noise from the spark generated when a measuring probe terminal is in contact with a lamp terminal or in contact with or separated from the capacitor pattern 162 to evaluate the characteristics of the inverter due to solving those problems affects the feedback signal line 178 to cause the inverter integrated circuit 134 to be mis-operated. To solve this problem, the feedback signal line 178 is formed on the rear surface of the inverter substrate 130 that corresponds between the inverter integrated circuit 134 and the transformer 136.

The feedback signal line 178 is formed for the first ground line 172 to have a designated width and is formed on the inverter substrate 130 to be separated from the first ground line 172 to the utmost, thereby preventing the distortion of the feedback signal supplied to the feedback signal line 178 by the above-described noise. In other words, the distance L1 between the feedback signal line 178 and the first ground line 172 is at least 10 mm or more.

Further, the second ground line 176 connected to the ground terminal of the inverter integrated circuits 134 is formed to have a broad width. The connecting line 174 is formed at the edge of one side of the inverter substrate 130 that is adjacent to a first transformer among the transformers 136.

The ground voltage from the ground voltage source GND (not shown) is supplied to any one of the first and second ground lines 172, 176, which are connected through the connecting line 174. At this moment, the distance L2 between the first and second ground lines 172, 174 is at least 20 mm or more.

In this way, the inverter substrate 130 supplies the AC waveform of high voltage from each of the transformers 136 to the high voltage electrode of the lamps 112 through each of the pattern capacitors 160. Accordingly, the lamps 112 generates the light using the high voltage AC waveform supplied from the inverter substrate 130, thereby illuminating it onto the liquid crystal display panel 106. Hereby, the liquid crystal display panel 106 controls the amount of transmitted light illuminated from the lamps 112 in accordance with the supplied data signal, thereby displaying a picture.

In this way, the lamp driving device of the liquid crystal display device according to the exemplary embodiment of the present invention forms the pattern capacitors on the inverter substrate 130 to limit the tube current of the lamps 112 and balance the current in the inside of the tube, thereby reducing the structure of the inverter substrate 130. Further, the lamp driving device of the liquid crystal display device according to the exemplary embodiment of the present invention lengthens the distance between the first and second ground lines 172, 176 and the feedback signal line 178 and have them formed to have a designated width, thereby preventing the mis-operation of the inverter integrated circuit 134 caused by the distortion of the feedback signal supplied to the feedback signal line 178 by the noise caused by the spark generated upon using the measuring probe terminal in order to evaluate the characteristic of the inverter.

As described above, the lamp driving device of the liquid crystal display device according to the exemplary embodiment of the present invention forms the pattern capacitors on the inverter substrate to limit the tube current of the lamps and balance the current in the inside of the tube, thereby reducing the structure of the inverter substrate. Further, the lamp driving device of the liquid crystal display device according to the exemplary embodiment of the present invention lengthens the distance between the first ground lines and the feedback signal line and have them formed to have a designated width, thereby preventing the mis-operation of the inverter integrated circuit caused by the distortion of the feedback signal supplied to the feedback signal line by the noise caused by the spark generated upon using the measuring probe terminal to evaluate the characteristics of the inverter.

It will be apparent to those skilled in the art that various modifications and variations can be made in the lamp driving device for a liquid crystal display device of the present invention without departing from the spirit or scope of the invention. Thus, it is intended that the present invention cover the modifications and variations of this invention provided they come within the scope of the appended claims and their equivalents.

What is claimed is:

1. A lamp driving device for driving a plurality of lamps in a liquid crystal display device, comprising:
   an inverter substrate;
   a plurality of transformers on the inverter substrate to supply a high voltage AC waveform to each of the lamps;

a plurality of pattern capacitors on the inverter substrate to limit the electric current supplied to each of the lamps, the pattern capacitors including a plurality of capacitor patterns on a front surface of the inverter substrate with a designated distance therebetween and a first ground line on a rear surface of the inverter substrate overlapping the capacitor patterns;

a feedback substrate connected to a low voltage electrode of each of the lamps;

a feedback circuit mounted on the feedback substrate to detect a tube current of the lamps to generate a feedback signal;

a feedback cable connected between the feedback circuit and the inverter substrate to supply the feedback signal to the inverter substrate;

a plurality of inverter integrated circuits arranged in series on the inverter substrate with a designated distance therebetween to convert a lamp drive voltage supplied from the outside by use of a switching device into an AC waveform;

a main integrated circuit disposed on the inverter substrate to control the inverter integrated circuits, wherein the plurality of transformers is arranged in series on the inverter substrate to convert the AC waveform from the inverter integrated circuits to a high voltage AC waveform and to supply the high voltage AC waveform to the pattern capacitors;

a plurality of output connectors arranged at an edge portion of the inverter substrate and connected with the pattern capacitors to output the high voltage AC waveform from each of the transformers to a high voltage electrode of each of the lamps;

a second ground line formed on the rear surface of the inverter substrate to supply a ground voltage to the inverter integrated circuit;

a connecting line to connect the first ground line with the second ground line; and a plurality of feedback signal lines disposed between the first ground line and the second ground line to provide the feedback signal, supplied through the feedback cable, to the inverter integrated circuits;

wherein a distance between the first ground line and the feedback signal line is at least 10 mm.

2. The lamp driving device according to claim 1, wherein the direct illumination type backlight unit includes:
a bottom cover to hold the lamps;
a diffusion plate to cover the front surface of the bottom cover; and
at least one optical sheet on the diffusion plate.

3. The lamp driving device according to claim 1, wherein the first ground line is disposed on the rear surface of the inverter substrate between the transformers and the output connectors.

4. The lamp driving device according to claim 1, wherein the second ground line is disposed on the rear surface of the inverter substrate between the main integrated circuit and the inverter integrated circuits.

5. The lamp driving device according to claim 1, wherein the feedback signal line is disposed on the rear surface of the inverter substrate between the inverter integrated circuits and the transformers.

6. The lamp driving device according to claim 1, wherein a distance between the first ground line and the second ground line is at least 20 mm.

7. A liquid crystal display device, comprising:
a liquid crystal display panel;
a direct illumination type backlight unit having a plurality of lamps to provide light to the liquid crystal display panel;

an inverter substrate having a plurality of transformers to supply a high voltage AC waveform to each of the lamps; and a plurality of pattern capacitors on the inverter substrate to limit the electric current supplied to each of the lamps, the pattern capacitors including a plurality of capacitor patterns on a front surface of the inverter substrate with a designated distance there between and a first ground line on a rear surface of the inverter substrate overlapping the capacitor patterns;

a feedback substrate connected to a low voltage electrode of each of the lamps;

a feedback circuit mounted on the feedback substrate to detect a tube current of the lamps to generate a feedback signal;

a feedback cable connected between the feedback circuit and the inverter substrate to supply the feedback signal to the inverter substrate;

wherein the inverter substrate includes: a plurality of inverter integrated circuits arranged in series with a designated distance therebetween to convert a lamp drive voltage supplied from the outside by use of a switching device into an AC waveform; a main integrated circuit disposed on the inverter substrate to control the inverter integrated circuits; a plurality of output connectors arranged at an edge portion of the inverter substrate and connected with the pattern capacitors to output the high voltage AC waveform from each of the transformers to a high voltage electrode of each of the lamps, wherein the plurality of transformers is arranged in series on the inverter substrate to convert the AC waveform from the inverter integrated circuits to a high voltage AC waveform and to supply the high voltage AC waveform to the pattern capacitors; a second ground line formed on the rear surface of the inverter substrate to supply a ground voltage to the inverter integrated circuit; a connecting line to connect the first ground line with the second ground line; and a plurality of feedback signal lines disposed between the first ground line; and the second ground line to provide the feedback signal, supplied through the feedback cable, to the inverter integrated circuits;

wherein a distance between the first ground line and the feedback signal line is at least 10 mm.

8. The liquid crystal display device according to claim 7, wherein the direct illumination type backlight unit includes:
a bottom cover to hold the lamps;
a diffusion plate to cover the front surface of the bottom cover; and
at least one optical sheet on the diffusion plate.

9. The liquid crystal display device according to claim 7, wherein the first ground line is disposed on the rear surface of the inverter substrate between the transformers and the output connectors.

10. The liquid crystal display device according to claim 7, wherein the second ground line is disposed on the rear surface of the inverter substrate between the main integrated circuit and the inverter integrated circuits.

11. The liquid crystal display device according to claim 7, wherein the feedback signal line is disposed on the rear surface of the inverter substrate between the inverter integrated circuits and the transformers.

12. The liquid crystal display device according to claim 7, wherein a distance between the first ground line and the second ground line is at least 20 mm.

* * * * *